United States Patent
Nakahara et al.

(10) Patent No.: US 12,195,613 B2
(45) Date of Patent: Jan. 14, 2025

(54) IONOMER, RESIN SHEET, AND LAMINATED GLASS

(71) Applicant: Kuraray Europe GmbH, Hattersheim (DE)

(72) Inventors: Atsuhiro Nakahara, Tsukuba (JP);
Takuro Niimura, Tsukuba (JP);
Tomoka Yamaguchi, Tokyo (JP);
Yoshiaki Asanuma, Kurashiki (JP);
Takahiro Tsukahara, Kurashiki (JP)

(73) Assignee: Kuraray Europe GmbH, Hattersheim (DE)

( * ) Notice: Subject to any disclaimer, the term of this patent is extended or adjusted under 35 U.S.C. 154(b) by 608 days.

(21) Appl. No.: 17/606,492

(22) PCT Filed: May 22, 2020

(86) PCT No.: PCT/JP2020/020379
§ 371 (c)(1),
(2) Date: Oct. 26, 2021

(87) PCT Pub. No.: WO2020/241515
PCT Pub. Date: Dec. 3, 2020

(65) Prior Publication Data
US 2022/0204735 A1    Jun. 30, 2022

(30) Foreign Application Priority Data

May 31, 2019   (JP) ................................. 2019-102380

(51) Int. Cl.
| | |
|---|---|
| B32B 17/10 | (2006.01) |
| B32B 27/30 | (2006.01) |
| C08F 220/14 | (2006.01) |
| C08L 23/08 | (2006.01) |
| C09J 123/08 | (2006.01) |

(52) U.S. Cl.
CPC .......... *C08L 23/0876* (2013.01); *B32B 17/10* (2013.01); *B32B 17/1055* (2013.01); *B32B 17/10935* (2013.01); *C08F 220/14* (2013.01); *B32B 2605/006* (2013.01)

(58) Field of Classification Search
None
See application file for complete search history.

(56) References Cited

U.S. PATENT DOCUMENTS

| | | | |
|---|---|---|---|
| 6,432,522 | B1 | 8/2002 | Friedman et al. |
| 2009/0151772 | A1 | 6/2009 | Hayes et al. |
| 2013/0274424 | A1 | 10/2013 | Weiand et al. |

FOREIGN PATENT DOCUMENTS

| | | | | |
|---|---|---|---|---|
| JP | 55109658 | A | * 8/1980 | ............. B32B 27/12 |
| JP | 2005087991 | A | 4/2005 | |
| JP | 2006233059 | A | 9/2006 | |
| JP | 2007084743 | A | 4/2007 | |
| JP | 2011507278 | A | 3/2011 | |
| JP | 2017519083 | A | 7/2017 | |
| WO | WO-2015199750 | A1 | 12/2015 | |
| WO | WO-2017196707 | A1 | 11/2017 | |

OTHER PUBLICATIONS

Machine translation of JP-55109658-A (no date).*
English translation of the International Preliminary Report on Patentability and Written Opinion issued Nov. 16, 2021 in PCT/JP2020/020379, 5 pages.
International Search Report issued Jul. 28, 2020 in PCT/JP2020/020379, 2 pages.

* cited by examiner

*Primary Examiner* — Michael J Feely
(74) *Attorney, Agent, or Firm* — Element IP, PLC

(57) ABSTRACT

The problem to be solved by the invention is to provide an ionomer having excellent transparency, maintaining a high elastic modulus at high temperatures, being less coloration, and having a reduced odor during molding processing. The means for solving the problem is an ionomer comprising 0.05 to 1.0 mol % of (meth)acrylic acid ester units, 4.5 to 9.0 mol % of carboxylic acid units, 0.65 to 3.0 mol % of carboxylic acid neutralized product units, and ethylene units, based on the total monomer units which constitute the resin, with the total content of the (meth)acrylic acid ester units, the carboxylic acid units, and the carboxylic acid neutralized product units being 7.0 to 10 mol %.

19 Claims, No Drawings

IONOMER, RESIN SHEET, AND LAMINATED GLASS

CROSS-REFERENCE TO RELATED APPLICATION

This application claims benefit under Article 4 of the Paris Convention base on Japanese Patent Application No. 2019-102380 filed in Japan on May 31, 2019, incorporated herein by reference in their entirety.

TECHNICAL FIELD

The present invention relates to an ionomer, and more particularly to an ionomer having excellent physical and optical properties, a resin sheet using the ionomer, and laminated glass using the resin sheet as an interlayer film.

BACKGROUND ART

An ionomer of a neutralized product of an ethylene-unsaturated carboxylic acid copolymer is used as an interlayer film of laminated glass because of its excellent transparency and adhesiveness to glass (for example, Patent Document 1). In recent years, the required performance for laminated glass has increased. Ionomers have also been required to have high transparency regardless of the production conditions of laminated glass, to maintain a high elastic modulus even at high temperatures and not to reduce the strength of laminated glass, moreover, to be far less coloration and to be excellent in appearance, and the like.

For example, Patent Document 2 describes an ionomer in which 5 to 15 mass % of an $\alpha,\beta$-unsaturated carboxylic acid derivative is introduced to an ethylene-unsaturated carboxylic acid copolymer as a third component. This ionomer exhibits improved optical characteristics.

However, in the ionomer of Patent Document 2, well-balanced and excellent characteristics in transparency, high elastic modulus and low coloring, which are required for an ionomer for an interlayer film of laminated glass, are still insufficient. Furthermore, in the ionomer of Patent Document 2, a strong odor derived from the third component is generated during molding processing, and it imposes a high burden on the worker, which is a new problem.

PRIOR ART DOCUMENTS

Patent Documents

Patent Document 1 U.S. Pat. No. 6,432,522 B1
Patent Document 2 JP 2017-519083 A

SUMMARY OF THE INVENTION

Problems to be Solved by the Invention

The present invention solves the above-mentioned conventional problems, and its object is to provide an ionomer having excellent transparency, maintaining a high elastic modulus at high temperatures, being less coloration, and having a reduced odor during molding processing.

Means for Solving the Problems

The present invention provides an ionomer comprising 0.05 to 1.0 mol % of (meth)acrylic acid ester units, 4.5 to 9.0 mol % of carboxylic acid units, 0.65 to 3.0 mol % of carboxylic acid neutralized product units, and ethylene units, based on the total monomer units which constitute the resin, with the total content of the (meth)acrylic acid ester units, the carboxylic acid units, and the carboxylic acid neutralized product unit being 7.0 to 10 mol %.

In one embodiment, the ionomer has a MFR of 0.7 g/10 min or more, as measured under the conditions at a measurement temperature of 190° C. and a load of 2.16 Kgf.

In one embodiment, the (meth)acrylic acid esters are at least one selected from the group consisting of methyl (meth)acrylate, ethyl (meth)acrylate, n-propyl (meth)acrylate, isopropyl (meth)acrylate, n-butyl (meth)acrylate, and isobutyl (meth)acrylate.

In one embodiment, the ionomer uses as a raw material an ethylene-(meth)acrylic acid ester copolymer comprising 6.5 to 10 mol % of (meth)acrylic acid ester units, and having a MFR of 90 to 400 g/10 min as measured under the conditions at a measurement temperature of 190° C. and load of 2.16 Kgf.

In one embodiment, the ionomer has a storage elastic modulus of 30 MPa or more as measured using a 0.8 mm-thick resin sheet-form test piece under the conditions at a measurement temperature of 50° C. and a frequency of 1 Hz, a yellow index (YI) of 2.0 or less as measured using a 0.8 mm-thick resin sheet-form test piece, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

Also, the present invention provides a resin composition containing any of the above ionomers in an amount of 93 mass % or more.

Also, the present invention provides a resin sheet substantially consisting of any of the above ionomers or the above resin composition.

Also, the present invention provides laminated glass having two glass plates and the above resin sheet as an interlayer film arranged between the two glass plates.

Effect of the Invention

According to the present invention, it is possible to provide an ionomer which is well-balanced and excellent in transparency, high elastic modulus and low coloring, and in addition, has a reduced odor during molding processing.

DESCRIPTION OF EMBODIMENTS

<Structure>

The ionomer of the present invention is a resin comprising ethylene units, (meth)acrylic acid ester units (A), carboxylic acid units (B) and carboxylic acid neutralized product units (C). In one embodiment, the ionomer of the present invention is a resin consisting of structural units (A), (B) and (C), and ethylene units.

Monomers which make the (meth)acrylic acid ester units (A) may include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, amyl (meth)acrylate, isoamyl (meth)acrylate, n-hexyl (meth)acrylate, cyclohexyl (meth)acrylate, 2-ethylhexyl (meth)acrylate, pentadecyl (meth)acrylate, dodecyl (meth)acrylate, isobornyl (meth)acrylate, phenyl (meth)acrylate, benzyl (meth)acrylate, phenoxyethyl (meth)acrylate, 2-hydroxyethyl (meth)acrylate, 2-methoxyethyl (meth)acrylate, glycidyl (meth)acrylate, allyl (meth)acrylate, and the like. Among these, methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate are preferred, methyl (meth)acrylate, ethyl (meth)acrylate, n-propyl (meth)acrylate, isopropyl (meth)acrylate, n-butyl (meth)acrylate, isobutyl (meth)acrylate are more preferred, methyl (meth)acrylate, n-butyl (meth)acrylate, isobutyl (meth)acrylate are further preferred, and methyl (meth)acrylate is most preferred. Of the methacrylic acid ester and the acrylic acid ester, the methacrylic acid ester is preferred because the methacrylic acid ester is excellent in thermal decomposition resistance and in low coloring properties. These (meth)acrylic acid esters may be used alone or in combination of two or more.

The content of the (meth)acrylic acid ester units (A) in the ionomer is 0.05 mol % or more and 1.0 mol % or less. When the content of (A) is within this range, the transparency increases and the odor during molding processing decreases. The preferred lower limit of the content is preferably 0.07 mol % or more, more preferably 0.08 mol % or more, and further preferably 0.09 mol % or more. The preferred upper limit of the content is 0.9 mol % or less, more preferably 0.8 mol % or less, further preferably 0.6 mol % or less.

Monomers which make the carboxylic acid units (B) include acrylic acid, methacrylic acid, itaconic acid, maleic anhydride, monomethyl maleate, monoethyl maleate and the like. Among these, acrylic acid, methacrylic acid, monomethyl maleate, and monoethyl maleate are more preferred, acrylic acid and methacrylic acid are further preferred, and methacrylic acid is most preferred. These carboxylic acid units may be used alone or in combination of two or more.

The content of the carboxylic acid units (B) in the ionomer is 4.5 mol % or more and 9.0 mol % or less.

When the content of (B) is within this range, it is possible to achieve both adhesiveness to glass and transparency. When the content is too low, the transparency is lowered and the adhesiveness to the glass is also lowered. When the content is too high, the molding processability is lowered and there is a tendency to be colored. The preferred lower limit of the content is preferably 5.0 mol % or more, more preferably 5.5 mol % or more, and further preferably 5.8 mol % or more. The preferred upper limit of the content is 8.5 mol % or less, more preferably 8.0 mol % or less, and further preferably 7.5 mol % or less.

The carboxylic acid neutralized product units (C) are preferably neutralized product units of the carboxylic acid units (B). The carboxylic acid neutralized products are those which are obtained by replacing the hydrogen ions of the carboxylic acid with metal ions. Examples of the metal ions include monovalent metal ions such as lithium, sodium and potassium, and multivalent metal ions such as magnesium, calcium, zinc, aluminum and titanium. Such metal ions need not to be used alone, and may be used in combination of two or more. For example, such a combination may be a combination of one or more monovalent metal ions and one or more divalent metal ions.

The content of the carboxylic acid neutralized product units (C) in the ionomer is 0.65 mol % or more and 3.0 mol % or less. When the content of (C) is within this range, both transparency and molding processability can be achieved. When the content is too high, the melt viscosity during molding processing increases and there is a tendency to be colored. When the content is too low, the transparency is low and the elastic modulus at 50° C. decreases. The preferred lower limit of the content is 1.0 mol % or more, more preferably 1.5 mol % or more, further preferably 1.7 mol % or more. The preferred upper limit of the content is preferably 2.7 mol % or less, more preferably 2.6 mol % or less, further preferably 2.5 mol % or less.

In the ionomer of the present invention, the total amount of the (meth)acrylic acid ester units (A), the carboxylic acid units (B) and the carboxylic acid neutralized product units (C) is 7.0 mol % or more and 10 mol % or less. When the total amount of (A), (B) and (C) is within this range, both high transparency and high elastic modulus at 50° C. of the ionomer can be achieved. The lower limit of the content is more preferably 7.5 mol % or more, further preferably 8.0 mol % or more, and most preferably 8.5 mol % or more. The upper limit of the content is more preferably 9.9 mol % or less, and further preferably 9.5 mol % or less.

<Production Method>

As the method for producing an ionomer of the present invention, a method is exemplified in which ethylene and (meth)acrylic acid ester are copolymerized at a high temperature and a high pressure to obtain an ethylene-(meth) acrylic acid ester copolymer (X), and then a part of the (meth)acrylic acid ester units are converted to (meth)acrylic acid units and (meth)acrylic acid neutralized product units. The method for converting a part of the (meth)acrylic acid ester units to (meth)acrylic acid units and (meth)acrylic acid neutralized product units includes a method in which a saponification reaction is carried out using sodium hydroxide to synthesize an ethylene-(meth)acrylic acid ester-(meth) acrylic acid neutralized product copolymer, and then a part of the (meth)acrylic acid neutralized product units are converted to (meth)acrylic acid with an acid.

As the (meth)acrylic acid ester which is used as a raw material in the above production method, the aforementioned (meth)acrylic acid esters may be used. Particularly, methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, and 2-ethylhexyl (meth)acrylate are preferred, and methyl (meth)acrylate, ethyl (meth)acrylate, n-butyl (meth)acrylate, and isobutyl (meth)acrylate are more preferred. Comparing the methacrylic acid ester and the acrylic acid ester, the methacrylic acid ester is more preferred because the resulting ionomer is excellent in thermal decomposition resistance and in low coloring properties. These (meth)acrylic acid esters may be used alone or in combination of two or more.

Specific examples of the ethylene-(meth)acrylic acid ester copolymer (X) may include an ethylene-methyl acrylate copolymer, an ethylene-methyl methacrylate copolymer, an ethylene-ethyl acrylate copolymer, an ethylene-ethyl methacrylate copolymer, an ethylene-n-propyl acrylate copolymer, an ethylene-n-propyl methacrylate copolymer, an ethylene-isopropyl acrylate copolymer, an ethylene-isopropyl methacrylate copolymer, an ethylene-n-butyl acrylate copolymer, an ethylene n-butyl methacrylate copolymer, an ethylene-sec-butyl acrylate copolymer, an ethylene-sec-butyl methacrylate copolymer, and the like. As these copolymers, commercially available products may be used, or the copolymers may be synthesized with reference to US 2013/0274424 A1, JP 2006-233059 A, and JP 2007-84743 A.

The content of the (meth)acrylic acid ester units of the ethylene-(meth)acrylic acid ester copolymer (X) is preferably 6.5 mol % or more and 10 mol % or less, more preferably 7.0 mol % or more and 9.5 mol % or less, and most preferably 7.5 mol % or more and 9.2 mol % or less. By setting the content within such a range, the contents of the (meth)acrylic acid ester units, the carboxylic acid units, and the carboxylic acid neutralized product units of the obtained ionomer can be set in an appropriate range.

The melt flow rate (MFR) of the ethylene-(meth)acrylic acid ester copolymer (X) as measured under the conditions at 190° C. and 2.16 Kgf is preferably 90 g/10 min or more and 400 g/10 min or less, more preferably 100 g/10 min or more and 350 g/10 min or less, and most preferably 150 g/10 min or more and 330 g/10 min or less. By setting the MFR of the ethylene-(meth)acrylic acid ester copolymer (X) within this range, it is possible to achieve both the molding processability and the strength of the obtained ionomer. The MFR of the ethylene-(meth)acrylic acid ester copolymer (X) can be adjusted by the degree of polymerization and the ratio of the (meth)acrylic acid ester units.

In the ethylene-(meth)acrylic acid ester copolymer (X), the lower limit of the weight-average molecular weight in terms of polystyrene as measured at a column temperature of 140° C., using 1,2,4-trichlorobenzene solvent and columns (TSKgel GMHHR-H (20) HT three in series), is preferably 15,000 g/mol or more, more preferably 20,000 g/mol or more, further preferably 25,000 g/mol or more, and particularly preferably 30,000 g/mol or more in view of achieving both the molding processability and the strength of the obtained ionomer. The upper limit of the weight-average molecular weight is preferably 200,000 g/mol or less, more preferably 100,000 g/mol or less, and further preferably 50,000 g/mol or less. The lower limit of the number-average molecular weight is preferably 3,000 g/mol or more, more preferably 5,000 g/mol or more, further preferably 8,000 g/mol or more, even further preferably 10,000 g/mol or more, and particularly preferably 15,000 g/mol or more. The upper limit of the number-average molecular weight is preferably 100,000 g/mol or less, more preferably 50,000 g/mol or less, and further preferably 30,000 g/mol or less.

The branching degree of the ethylene-(meth)acrylic acid ester copolymer (X) per 1000 carbon atoms is not particularly limited, but is preferably 5 to 30, and more preferably 6 to 20. Analysis of the branching degree per 1000 carbon atoms can be performed by dissolving an ethylene-(meth)acrylic acid ester copolymer in deuterated ortho-dichlorobenzene and then using the $^{13}$C-NMR inverse gated decoupling method.

In a method of converting a part of the (meth)acrylic acid ester units of the ethylene-(meth)acrylic acid ester copolymer (X) to (meth)acrylic acid units and (meth)acrylic acid neutralized product units, a saponification reaction of a part of the (meth)acrylic acid ester units of the (meth)acrylic acid ester copolymer (X) is carried out with an alkali to convert them to (meth)acrylic acid neutralized product units, and then a part of the (meth)acrylic acid neutralized product units are dematalized with an acid to convert them to (meth)acrylic acid units, thus making it possible to produce an ionomer having ethylene units, (meth)acrylic acid ester units, carboxylic acid units, carboxylic acid neutralized product units.

In an alternative method, a saponification reaction of a part of the (meth)acrylic acid ester units of the ethylene-(meth)acrylic acid ester copolymer (X) is carried out with an alkali to convert them to (meth)acrylic acid neutralized product units, and then all the (meth)acrylic acid neutralized product units are demetalized with an acid to convert them to (meth)acrylic acid units, and, furthermore, a part of them are neutralized with an alkali metal or an alkaline earth metal, thus making it possible to produce an ionomer having ethylene units, (meth)acrylic acid ester units, carboxylic acid units, and carboxylic acid neutralized product units.

As the solvent when a saponification reaction of a part of the (meth)acrylic acid ester units of the ethylene-(meth) acrylic acid ester copolymer (X) is carried out with an alkali, ether solvents such as tetrahydrofuran and dioxane, halides such as chloroform, and dichlorobenzene, ketones having 6 or more carbon atoms such as methyl butyl ketone, hydrocarbon compounds such as n-hexane and cyclohexane, a mixed solvent of a hydrocarbon compound and an alcohol such as methanol, ethanol, 1-propanol, 2-propanol, or 1-butanol, aromatic compounds such as benzene, toluene, xylene, and ethylbenzene, a mixed solvent of an aromatic compound and an alcohol are exemplified. Since the ethylene-(meth)acrylic acid ester copolymer (X) suitable in the present invention preferably contains (meth)acrylic acid ester units in a specific ratio, it is important to select an appropriate solvent and reaction conditions in order to produce the ionomer of the present invention.

In view of the reactivity and the solubility of the ethylene-(meth)acrylic acid ester copolymer (X), the temperature at which a saponification reaction of a part of the (meth)acrylic acid ester units of the ethylene-(meth)acrylic acid ester copolymer (X) is carried out is preferably 50° C. or more, more preferably 60° C. or more, further preferably 70° C. or more, and most preferably 80° C. or more. The upper limit is not particularly limited, but a temperature at which the ethylene-(meth)acrylic acid ester copolymer (X) does not decompose is preferable, for example, it is 300° C. or less.

A known organic acid such as acetic acid, hydrochloric acid, nitric acid, or sulfuric acid may be used as an acid when a saponification reaction of a part of the (meth)acrylic acid ester units of the ethylene-(meth)acrylic acid ester copolymer (X) is carried out with an alkali to convert them to (meth)acrylic acid neutralized product units, and then a part of the (meth)acrylic acid neutralized product units are demetalized with an acid to convert them to (meth)acrylic acid units. As the solvent for demetalization with an acid, the same solvent as one in the case where the saponification reaction is carried out may be selected.

As a neutralizer when a saponification reaction of a part of the (meth)acrylic acid ester units of the ethylene-(meth) acrylic acid ester copolymer (X) is carried out with an alkali to convert them to (meth)acrylic acid neutralized product units, and then all the (meth)acrylic acid neutralized product units are demetalized with an acid to convert them to (meth)acrylic acid units, and, furthermore, a part of them are neutralized with an alkali metal or an alkaline earth metal, it is not particularly limited as long as it is an ionic compound containing the aforementioned metal ions. Examples of the metal ions include alkali metal ions such as lithium, potassium and sodium; alkaline earth metal ions such as magnesium and calcium; transition metal ions such as zinc, nickel, iron and titanium; aluminum ions, and the like. For example, as the neutralizer when the metal ions are sodium cations, sodium hydroxide, sodium acetate, sodium hydrogen carbonate and the like are exemplified. Furthermore, a polymer such as an ionomer containing sodium carboxylate units may also be used as the neutralizer.

The contents of the (meth)acrylic acid ester units, the carboxylic acid units, and the carboxylic acid neutralized product units in the ionomer of the present invention can be analyzed in accordance with the following procedure. First, the structural units in the ionomer are identified by pyrolysis gas chromatography, and then their respective contents can be evaluated using nuclear magnetic resonance spectroscopy (NMR) and elemental analysis. IR and Raman analysis may also be combined. Prior to these analyses, it is preferred to remove components other than ionomers by a repreciptation method or a Soxhlet extraction method.

The melting point of the ionomer of the present invention is preferably 50° C. or more and 200° C. or less, more preferably 60° C. or more and 180° C. or less, and further preferably 80° C. or more and 150° C. or less. With reference to the method described in JIS K 7121: 2012, the melting point can be determined, using differential scanning calorimetry (DSC), from the peak top temperature of the melting peak in the second heating, at a cooling rate of −10° C./min and a heating rate of 10° C./min.

The heat of fusion of the ionomer of the present invention is preferably 0 J/g or more and 25 J/g or less. With reference to the method described in JIS K7122: 2012, it can be calculated, using differential scanning calorimetry (DSC), from the area of the melting peak during the second heating, at a cooling rate of −10° C./min and a heating rate of 10° C./min.

The melt flow rate (MFR) of the ionomer of the present invention as measured under the conditions at 190° C. and 2.16 Kgf is preferably 0.3 g/10 min or more, more preferably 0.7 g/10 min or more, further preferably 1.0 g/10 min or more, even further preferably 1.5 g/10 min or more, and particularly preferably 2.0 g/10 min or more. The upper limit is not particularly limited, but is preferably 50 g/10 min or less, more preferably 30 g/10 min or less, further preferably 10 g/10 min or less, and particularly preferably 5 g/10 min or less. When the MFR of the ionomer is within such a range, molding processing in which deterioration attributed to heat is suppressed becomes possible. The MFR of the ionomer can be adjusted by the molecular weight and the amounts of (meth)acrylic acid ester units (A), carboxylic acid units (B) and carboxylic acid neutralized product units (C).

In a method for measuring the molecular weight, the ionomer is heated and dissolved in a mixed solvent of acetic acid/toluene to convert carboxylic acid neutralized product units to carboxylic acid units. Furthermore, the carboxylic acid units are esterified to methyl carboxylate with trimethylsilyldiazomethane. After dissolving the obtained copolymer in orto-dichlorobenzene, the molecular weight may be measured using high temperature SEC. A calibration curve using polystyrene as a standard substance is drawn and the molecular weight in terms of polystyrene is calculated.

The degree of branching per 1000 carbon atoms of the ionomer of the present invention is not particularly limited, but is preferably 5 to 30, and more preferably 6 to 20. The degree of branching per 1000 carbon atoms can be analyzed by the DDMAS method using solid-state NMR.

The storage elastic modulus (E') at 50° C. to be measured in the dynamic viscoelasticity measurement of the ionomer of the present invention is preferably 20 MPa or more, more preferably 30 MPa or more, further preferably 40 MPa or more, and most preferably 50 MPa or more. The upper limit of the storage elastic modulus (E') is not particularly limited, but is preferably 1000 MPa or less. In the present invention, the storage elastic modulus (E') is measured in accordance with the method described in Examples.

<Resin Composition>

The ionomer of the present invention may contain an age inhibitor, an antioxidant, and a thermal degradation inhibitor, as necessary. The blending amount of such various additives may be appropriately determined as far as the effects of the present invention are not impaired, and the total amount thereof is preferably 7 mass % or less, more preferably 5 mass % or less, and further preferably 4 mass % or less.

The resin composition preferably contains the ionomer of the present invention in an amount of 93 mass % or more, more preferably 95 mass % or more, and further preferably 96 mass % or more.

Various additives may be added to the polymerization or polymer reaction system in producing the ionomer, may be added in the step of separating the resin, or may be added after the separation. Furthermore, it may be added during the production of a molded product such as a film.

As the age inhibitor, known materials may be used. Specifically, phenolic compounds such as hydroquinone, hydroquinone monomethyl ether, 2,5-di-t-butylphenol, 2,6-di(t-butyl)-4-methylphenol, and mono(or di or tri)(α-methylbenzyl) phenol; bisphenolic compounds such as 2,2'-methylenebis(4-ethyl-6-t-butylphenol), 4,4'-butylidenebis(3-methyl-6-t-butylphenol), and 4,4'-thiobis(3-methyl-6-t-butylphenol); benzimidazole-based compounds such as 2-mercaptobenzimidazole, and 2-mercaptomethylbenzimidazole; amine-ketone-based compounds such as 6-ethoxy-1,2-dihydro-2,2,4-trimethylquinoline polymer, a reaction product of diphenylamine and acetone, and 2,2,4-trimethyl-1,2-dihydroquinoline polymer; aromatic secondary amine-based compounds such as N-phenyl-1-naphthylamine, alkylated diphenylamine, octylated diphenylamine, 4,4'-bis(α,α-dimethylbenzyl)diphenylamine, p-(p-toluenesulfonylamide) diphenylamine, and N,N'-diphenyl-p-phenylenediamine; thiourea-based compounds such as 1,3-bis (dimethylaminopropyl)-2-thiourea and tributylthiourea, and the like may be used.

The antioxidant is effective in preventing oxidative degradation of the resin by itself in the presence of oxygen. For example, phosphorus-based antioxidants, hindered phenolic antioxidants, thioether-based antioxidants, and the like may be exemplified. These antioxidants may be used alone or in combination of two or more. Among these, phosphorus-based antioxidants and hindered phenolic antioxidants are preferred in view of the effect of preventing deterioration of the optical properties due to coloring, and the combined use of a phosphorus-based antioxidant and a hindered phenolic antioxidant is more preferred.

When a phosphorus-based antioxidant and a hindered phenol-based antioxidant are used in combination, the amount of the phosphorus-based antioxidant used: the amount of the hindered phenolic antioxidant used is preferably from (1:5) to (2:1) in terms of the mass ratio, and more preferably (1:2) to (1:1).

As the phosphorus-based antioxidant, 2,2-methylenebis (4,6-di-t-butylphenyl) octylphosphite (manufactured by ADEKA Corporation; trade name: ADEKA STAB HP-10), tris(2,4-di-t-butylphenyl) phosphite (manufactured by BASF; trade name: IRGAFOS 168), 3,9-bis(2,6-di-t-butyl-4-methylphenoxy)-2,4,8,10-tetraoxa-3,9-diphosphaspiro[5.5]undecane (manufactured by ADEKA Corporation; trade name: ADEKA STAB PEP-36) and the like are preferred.

As the hindered phenolic antioxidant, pentaerythrityl-tetrakis[3-(3,5-di-t-butyl-4-hydroxyphenyl)propionate] (manufactured by BASF; trade name IRGANOX 1010), octadecyl-3-(3,5-di-t-butyl-4-hydroxyphenyl) propionate (manufactured by BASF; trade name IRGANOX 1076) and the like are preferred.

The thermal degradation inhibitor can prevent thermal degradation of the resin by capturing polymer radicals generated when exposed to high heat under substantially oxygen-free conditions.

As the thermal degradation inhibitor, 2-t-butyl-6-(3'-t-butyl-5'-methyl-hydroxybenzyl)-4-methyl phenyl acrylate (manufactured by Sumitomo Chemical Co., Ltd.; trade name Sumilizer GM), 2,4-di-t-amil-6-(3',5'-di-t-amil-2'-hydroxy- α-methylbenzyl) phenyl acrylate (manufactured by Sumitomo Chemical Co., Ltd.; trade name Sumilizer GS) and the like are preferred.

In the present invention, in addition to the above-mentioned age inhibitor, antioxidant, and thermal degradation inhibitor, various additives such as an ultraviolet absorber, a light stabilizer, an agglutination inhibitor, a lubricant, a release agent, a polymer processing aid, an antistatic agent, a flame-retardant, a dye, an organic pigment, a matting agent, and a phosphor may also be added to the ionomer as necessary. The blending amount of such various additives may be appropriately determined within a range that does not impair the effects of the present invention, and the total amount thereof is preferably 7 mass % or less, more preferably 5 mass % or less, and further preferably 4 mass % or less.

Various additives may be added to the polymerization or polymer reaction system in producing the ionomer, may be added in the step of separating the resin, or may be added after the separation. Furthermore, it may be added during the production of a molded product such as a film.

The ultraviolet absorber is a compound having the ability to absorb ultraviolet rays, and is said to have a function of mainly converting light energy to heat energy.

As the ultraviolet absorber, benzophenones, benzotriazoles, triazines, benzoates, salicylates, cyanoacrylates, oxalic acid anilides, malonic esters, formamidines and the like are exemplified. These may be used alone or in combination of two or more.

Benzotriazoles are preferred as ultraviolet absorbers because they are highly effective in suppressing the deterioration of the optical properties such as coloring due to exposure to ultraviolet rays. As benzotriazoles, 2-(2H-benzotriazol-2-yl)-4-(1,1,3,3-tetramethylbutyl)phenol (manufactured by BASF; trade name TINUVIN 329), 2-(2H-benzotriazol-2-yl)-4,6-bis(1-methyl-1-phenylethyl)phenol (manufactured by BASF; trade name TINUVIN 234), 2,2'-methylenebis[6-(2H-benzotriazol-2-yl)-4-t-octylphenol] (manufactured by ADEKA CORPORATION; LA-31), 2-(5-octylthio-2H-benzotriazol-2-yl)-6-tert-butyl-4-methylphenol, and the like are preferred.

As triazines ultraviolet absorbers, 2,4,6-tris(2-hydroxy-4-hexyloxy-3-methylphenyl)-1,3,5-triazine (manufactured by ADEKA CORPORATION; LA-F70) and its analogs, hydroxyphenyltriazine-based ultraviolet absorbers (manufactured by BASF; TINUVIN 477 and TINUVIN 460), 2,4-diphenyl-6-(2-hydroxy-4-hexyloxyphenyl)-1,3,5-triazine and the like may be exemplified.

The light stabilizer is a compound that is said to have a function of capturing radicals mainly generated by oxidation by light. Suitable light stabilizers include hindered amines such as compounds having a 2,2,6,6-tetraalkylpiperidine skeleton.

As the agglutination inhibitor, fatty acid salts or esters, polyhydric alcohol esters, inorganic salts, inorganic oxides, and particulate resins are preferred. Specific examples include calcium stearate, calcium carbonate, calcium sulfate, magnesium sulfate, barium sulfate, silicon dioxide (manufactured by Evonik; trade name Aerosil), particulate acrylic resin and the like are exemplified.

Examples of the lubricant include stearic acid, behenic acid, stearamide acid, methylene bis-stearamide, hydroxystearic acid triglyceride, paraffin wax, ketone wax, octyl alcohol, hardened oil and the like.

The release agent includes higher alcohols such as cetyl alcohol and stearyl alcohol; glycerin higher fatty acid esters such as stearic acid monoglyceride, stearic acid diglyceride, and the like.

As the polymer processing aid, polymer particles having a particle size of 0.05 to 0.5 μm, which can be produced by an emulsion polymerization method, are usually used. The polymer particles may be single-layer particles composed of a polymer having a single composition ratio and a single limiting viscosity, or may be multilayer particles composed of two or more kinds of polymers having different composition ratios or limiting viscosities. Among these, the preferred include two-layer structure particles having a polymer layer with a low limiting viscosity in an inner layer, and having a polymer layer with a high limiting viscosity of 5 dl/g or more in an outer layer. The polymer processing aid preferably has a limiting viscosity of 3 to 6 dl/g. When the limiting viscosity is too low, the improved effect of moldability tends to be low. When the limiting viscosity is too high, deterioration in the molding processability of the copolymer tends to be caused.

As the organic dye, a compound having a function of converting ultraviolet rays to visible rays is preferably used.

The phosphor includes a fluorescent pigment, a fluorescent dye, a fluorescent white dye, a fluorescent brightener, a fluorescent bleach and the like.

The ionomer of the present invention and the resin composition containing the ionomer of the present invention may be formed into pellets and the like in order to enhance the convenience during storage, transportation, or molding. When they are molded into pellets, they can be obtained by cutting strands obtained by the melt extrusion method. The resin temperature during melt extrusion is preferably 150° C. or more, and more preferably 170° C. or more. The resin temperature during extrusion is preferably 250° C. or less, and more preferably 230° C. or less. On this occasion, the worker's health can be ensured by using the resin of the present invention having less odor. The ionomer of the present invention and the resin composition containing the ionomer of the present invention are useful as an interlayer film for laminated glass.

<Resin Sheet>

The resin sheet of the present invention may be composed of only a layer (x) containing the ionomer or a resin composition thereof, or may be a multilayer film containing at least one layer (x). The multilayer film is not particularly limited, and examples thereof include a two-layer film in which a layer (x) and another layer are laminated, a film in which another layer is arranged between two layers (x), and the like.

The other layer includes a layer containing a publicly known resin. As the resin, for example, polyethylene, polypropylene, polyvinyl chloride, polystyrene, polyurethane, polytetrafluoroethylene, acrylic resin, polyamide, polyacetal, polycarbonate, and among polyesters, polyethylene terephthalate, polybutylene terephthalate, cyclic polyolefin, and polyphenylensulfide, polytetrafluoroethylene, polysulfone, polyethersulfone, polyarylate, a liquid crystal polymer, polyimide, a thermoplastic elastomer and the like may be used. In addition, as necessary, the other layer may also contain an additive such as a plasticizer, an antioxidant, an ultraviolet absorber, a light stabilizer, an antiblocking agent, a pigment, a dye, and a heat shield material (for example, inorganic heat shield fine particles or organic heat shield materials having an infrared absorbing ability), a functional inorganic compound and the like.

The method for producing the resin sheet of the present invention is not particularly limited. For example, it is obtained by uniformly kneading the ionomer of the present invention or the resin composition containing the ionomer of the present invention, and then forming it in a layer (x) by a known film forming method such as an extrusion method, a calendar method, a pressing method, a solution casting method, a melt casting method, an inflation method or the like. The layer (x) may be used alone as a resin sheet. As necessary, the layer (x) may be laminated with other layer by press molding or the like to form a laminated resin sheet, or the layer (x) and the other layer may be molded by a coextrusion method to form a laminated resin sheet.

Among the known film-forming methods, a method for producing a resin sheet using an extruder is particularly suitably used. The resin temperature during extrusion is preferably 150° C. or more, and more preferably 170° C. or more.

The resin temperature during extrusion is preferably 250° C. or less, and more preferably 230° C. or less. When the resin temperature is too high, the resin used decomposes, and deterioration of the resin is concerned. Conversely, when the temperature is too low, the discharge from the extruder is not stable, which becomes a cause of mechanical trouble. In order to efficiently remove volatile substances, it is preferred to remove the volatile substances from a vent port of the extruder by reducing the pressure. Even when the volatile substances are removed efficiently, an odor is generated at a T-die and the like, which may significantly deteriorate the working environment. By using the ionomer of the present invention, it is possible to form a film without deteriorating the working environment during film formation.

Furthermore, it is preferred to form concavo-convex structures such as melt fractures and embosses on the surface of the resin sheet of the present invention by a conventionally known method. As the shapes of the melt fractures and embosses, the conventionally known may be adopted. Formation of concavo-convex structures on the surface of the resin sheet of the present invention provides an excellent foam removing property when the resin sheet and a substrate such as glass are thermally pressure-bonded, which is preferred.

The lower limit of the thickness of the resin sheet of the present invention is 0.1 mm, 0.2 mm, 0.3 mm, 0.4 mm, 0.5 mm, 0.6 mm, 0.7 mm, and 0.75 mm in the order of preference (the first lower limit is preferable and the last lower limit is most preferable). The upper limit is 5 mm, 4 mm, 2 mm, 1.6 mm, 1.2 mm, 1.1 mm, 1 mm, and 0.79 mm in the order of preference (the first upper limit is preferred and the last upper limit is most preferred). The thickness of the resin sheet is measured using a conventionally known method, for example, a contact type or non-contact type thickness gauge or the like. The resin sheet may be in a state of being rolled up, or may be in a state of one-by-one sheet.

The resin sheet of the present invention has a morphology, a storage modulus (E'), and a haze described on the melt-kneaded product of the resin composition of the present invention.

The resin sheet of the present invention is preferably less coloration and is colorless as much as possible. When the film thickness is 0.8 mm, VI is preferably 2.0 or less, more preferably 1.8 or less, further preferably 1.5 or less, and most preferably 1.0 or less. The lower limit is 0.

The resin sheet of the present invention preferably has a low water content. For example, the water content is preferably 1 mass % or less, more preferably 0.5 mass % or less, further preferably 0.02 mass % or less, and most preferably 0.01 mass % or less.

<Laminated Glass>

The resin sheet of the present invention is preferably used as an interlayer film for laminated glass. In that case, as the glass to be laminated with the interlayer film, which is the resin sheet of the present invention, for example, inorganic glass such as float plate glass, reinforced glass, polished plate glass, figured plate glass, wired plate glass, or heat ray absorbing plate glass, and in addition, conventionally known organic glass such as polymethyl methacrylate or polycarbonate may be used without limitation. These may be either colorless or colored. These may be used alone or in combination of two or more. The thickness of the glass is preferably 100 mm or less.

Laminated glass formed by interposing the resin sheet of the present invention between two sheets of glass may be produced by a conventionally known method. For example, a method using a vacuum laminator device, a method using a vacuum bag, a method using a vacuum ring, a method using a nip roll, and the like are exemplified. Furthermore, a method in which after performing temporary pressure-bonding by the above method, it is put in an autoclave for real pressure-bonding is also exemplified.

When using a vacuum laminator device, an inorganic glass plate, an interlayer film, an adhesive resin layer, and an organic glass plate are laminated, for example, under reduced pressure of $1 \times 10^{-6}$ to $3 \times 10^{-2}$ MPa, at 60 to 200° C., particularly 80 to 160° C. Methods using vacuum bags or vacuum rings are described, for example, in European Patent 1235683 B1, where they are laminated at 100 to 160° C. under a pressure of about $2 \times 10^{-2}$ MPa.

The production method using a nip roll includes a method in which after degassing with a roll at a temperature equal to or lower than the flow start temperature of the interlayer film, they are pressure-bonded at a temperature closer to the flow start temperature. Specifically, a method in which after heating to 30 to 70° C., for example, with an infrared heater or the like, they are degassed with a roll, and after further heating to 50 to 120° C., they are pressure-bonded with a roll is exemplified.

When put in an autoclave for further pressure-bonding after they are pressure-bonded using the above method, the operating conditions of the autoclaving step are appropriately selected depending on the thickness and composition of the laminated glass. For example, it is preferably treated at 100 to 160° C. for 0.5 to 3 hours under a pressure of 0.5 to 1.5 MPa.

The laminated glass of the present invention has excellent transparency. For example, the haze of the laminated glass where the film thickness of the interlayer film is 0.8 mm is preferably 1% or less, more preferably 0.8% or less, and further preferably 0.5% or less. The lower limit is not particularly specified, but is 0.01%. In the present invention, the haze is measured using a haze meter HZ-1 (manufactured by Suga Test Instruments Co., Ltd.) in accordance with JIS K7 136: 2000.

Of the laminated glass of the present invention, the glass having excellent transparency even after being heated to 140° C. and then being gradually cooled from 140° C. to 23° C. at a rate of 0.1° C./min is particularly preferred. For example, the haze after gradual cooling of the laminated glass where the thickness of the interlayer film is 0.8 mm is preferably 5.0% or less, more preferably 4.5% or less, further preferably 4.0% or less, and most preferably 3.0% or less. The lower limit is not specified, but it is 0.01%.

The laminated glass of the present invention is preferably less coloration and colorless as much as possible.

For example, laminated glass having an interlayer film thickness of 0.8 mm preferably has a YI of 2.0 or less, more preferably 1.8 or less, further preferably 1.5 or less, and most preferably 1.0 or less. The lower limit is 0.

Higher adhesive force is preferred between the glass and the interlayer film of the laminated glass of the present invention. For example, the value evaluated by the compression shear strength test described in WO 1999-058334 A2 is preferably 15 MPa or more, more preferably 20 MPa or more, and most preferably 25 MPa or more. The upper limit is not specified, but is 100 MPa or less.

As described above, the resin sheets obtained by molding the ionomer of the present invention and the resin composition containing the ionomer of the present invention are useful as an interlayer film for laminated glass. The interlayer film for laminated glass is particularly preferred as an interlayer film of laminated glass for structural materials because they are excellent in adhesiveness to a substrate such as glass, transparency, and self-supporting properties. Furthermore, it is suitable not only as an interlayer film of laminated glass for structural materials, but also as an interlayer film for laminated glass in various applications such as automobile front glass, automobile side glass, automobile sunroof, automobile rear glass, head-up display glass, in addition, moving objects such as automobiles, laminates for outer walls and roofs, building materials such as panels, doors, windows, walls, roofs, sunroofs, sound insulating walls, display windows, balconies, and handrail walls, partition glass members for conference rooms, and solar batteries. However, it is not limited to these applications.

EXAMPLES

Hereinafter, the present invention will be specifically described with reference to Examples and Comparative Examples, but the present invention is not limited to the following Examples.

[Analysis of Resins Obtained in Examples and Comparative Examples]

The contents of (meth)acrylic acid ester units, carboxylic acid units, and carboxylic acid neutralized product units were analyzed in the following manner.

An ionomer obtained by the method described below or a resin composition containing the ionomer is dissolved in a mixed solvent of dehydrated toluene/dehydrated acetic acid (75/25 mass %), allowed to react at 100° C. for 2 hours, and was then reprecipitated in a mixed solvent of (80/20 mass %), so that carboxylic acid neutralized products were converted to carboxylic acids. The obtained resin was thoroughly washed with water and then dried. The obtained resin was analyzed for components of polymerization units by pyrolysis GC-MS (1). Next, the acid value of the obtained resin was measured according to JIS K0070-1992 (2). The obtained resin was also subjected to $^1$H-NMR measurement (400 MHz, manufactured by JEOL Ltd.) in a mixed solvent of deuterated toluene and deuterated methanol (3). Also, after pretreatment of the ionomer or the resin composition containing the ionomer by microwave decomposition with nitric acid, the species and amount of metal ions of the carboxylic acid neutralized products were identified by ICP emission spectrometry (Thermo Fisher Scientific iCAP6500Duo) (4). From (1), the types and structures of (meth)acrylic acid ester units and carboxylic acid units were identified, and based on that information, the ratio of ethylene/(meth)acrylic acid ester units/(total of carboxylic acid units and carboxylic acid neutralized product units) was calculated from the information in (2) and (3). Furthermore, the ratio of ethylene/(meth)acrylic acid ester units/carboxylic acid unis/carboxylic acid neutralized product units was calculated from the information in (4).

[Melt Flow Rate (MFR)]

In accordance with JIS K7210, in regard to the resin melted in a cylinder to be measured, the amount per 10 min of the resin extruded from a die with a specified diameter installed at the bottom of the cylinder was measured under the conditions at 190° C. and 2.16 kgf load.

[Odor]

50 g of an ionomer obtained by the method described below or a resin composition containing the ionomer was melt-kneaded at 220° C. and 100 rpm with a Labo Plastomill (manufactured by Toyo Seiki Seisaku-sho, Ltd.) A charge inlet of the Labo Plastomill was open, and odors were compared at a place at a distance of 50 mm directly above it. Each odor was measured for 30 seconds from 5 minutes after the start of melt-kneading using a portable odor sensor (model: XP-329m, manufactured by NEW COSMOS ELECTRIC CO., LTD.), and the average values of the maximum values and minimum values of the odor values for 30 seconds were compared. The higher the odor value is shown, the stronger the odor is, and the case where the odor value was 700 or more was evaluated as "B", and the case where the odor value was less than 700 was evaluated as "A".

[Self-Supporting Properties Under High Temperature Environment]

A melt-kneaded product of an ionomer obtained by the method described below or a resin composition containing the ionomer was compression-molded at a pressure of 50 kgf/cm$^2$ for 5 minutes under heating at 210° C. to obtain a resin sheet having a thickness of 0.8 mm. A test piece of 40 mm in length×5 mm in width was cut out from the sheet, and the storage elastic modulus (E') was measured under the conditions at a measurement temperature of 50° C. and a frequency of 1 Hz using a dynamic viscoelasticity measuring device manufactured by UBM Co., Ltd. The value was adopted as an index for the self-supporting properties of the resin sheet under a high temperature environment. The case where the storage elastic modulus was 30 MPa or more was evaluated as "A", and the case where the storage elastic modulus was less than 30 MPa was evaluated as "B".

[Coloring Properties]

A melt-kneaded product of an ionomer obtained by the method described below or a resin composition containing the ionomer was compression-molded at a pressure of 50 kgf/cm$^2$ for 5 minutes under heating at 210° C. to obtain a resin sheet having a thickness of 0.8 mm. The sheet was measured in accordance with JIS Z 8722 using a colorimetry colorimeter "ZE-2000" (trade name) manufactured by NIPPON DENSHOKU INDUSTRIES Co., Ltd. The yellowness value calculated in accordance with JIS K7373 based on the obtained value was expressed as a yellow index (YI). When the measured YI was 2.0 or less, it was evaluated as "A"; when the measured YI was more than 2.0 and less than 3.0, it was evaluated as "B"; and when the measured YI was 3.0 or more, it was evaluated as "C".

[Transparency]

A melt-kneaded product of an ionomer obtained by the method described below or a resin composition containing the ionomer was compression-molded at a pressure of 50 kgf/cm$^2$ for 5 minutes under heating at 210° C. to obtain a resin sheet having a thickness of 0.8 mm. The obtained sheet was interposed between two pieces of float glass each with a thickness of 2.7 mm, the inside of the vacuum laminator was depressurized for 1 minute at 100° C. using a vacuum laminator (1522N manufactured by Nisshinbo Mechatronics Inc.), and it was pressed at 30 kPa for 5 minutes with the degree of decompression and temperature being maintained to provide a temporarily bonded product. The obtained temporarily bonded product was put in an autoclave and treated at 140° C. and 1.2 MPa for 30 minutes to provide laminated glass.

Laminated glass obtained by the above method was heated to 140° C. and then gradually cooled to 23° C. at a rate of 0.1° C./min. The haze of the laminated glass after the gradual cooling operation was measured using a haze meter HZ-1 (manufactured by Suga Test Instruments Co., Ltd.) in accordance with JIS K7136: 2000. When the measured haze was 5.0% or less, it was evaluated as "A", when the measured haze was more than 5.0% and less than 10%, it was evaluated as "B", and when the measured haze was 10% or more, it was evaluated as "C".

Table 1 summarizes ethylene-(meth)acrylic acid ester copolymers (X) used as raw materials for producing ionomers of the present examples and comparative examples. These ethylene-(meth)acrylic acid ester copolymers (X) can be synthesized by the high-temperature and high-pressure radical polymerization method described in US 2013/0274424 A1, JP 2006-233059 A or JP 2007-84743 A. For example, "Acryft" (registered trademark) WD301F manufactured by Sumitomo Chemical Co., Ltd. may be used as EMMA1, and "Rexpearl" (registered trademark) A4250 manufactured by Japan Polyethylene Corporation may be used as EEA1.

TABLE 1

|  | Modification Amount | | MFR |
| --- | --- | --- | --- |
|  | mass % | mol % | g/10 min |
| EMMA 1 | 10 | 3.0 | 7 |
| EMMA 2 | 18 | 5.8 | 7 |
| EMMA 3 | 20 | 6.5 | 20 |
| EMMA 4 | 24 | 8.1 | 100 |
| EMMA 5 | 25 | 8.5 | 150 |
| EMMA 6 | 28 | 9.8 | 150 |
| EMMA 7 | 25 | 8.5 | 210 |
| EEA 1 | 25 | 8.5 | 5 |
| EEA 2 | 25 | 8.5 | 200 |
| EMA | 24 | 9.3 | 330 |

EMMA: a copolymer of ethylene and methyl methacrylate
EEA: a copolymer of ethylene and ethyl acrylate
EMA: a copolymer of ethylene and methyl acrylate
Modification Amount: Content of (meth)acrylic acid ester units based on the entire resin Example 1

To 100 parts by mass of EMMA 4 in Table 1 were added 233 parts by mass of toluene and dissolved at 60° C. under 0.02 MPa pressure. To the obtained solution were added 96 parts by mass of a solution of sodium hydroxide (20 mass %) in methanol to saponify methyl methacrylate units at 100° C. for 2 hours, and convert them to sodium methacrylate units.

To this solution were added 44 parts by mass of concentrated hydrochloric acid (36 mass %), and a part of the sodium methacrylate units were converted to methacrylic acid at 100° C. for 2 hours. The obtained solution was reprecipitated in a mixed solvent of acetone/water (80/20 mass %) to afford ionomer 1. The resulting ionomer 1 was then analyzed and its properties were evaluated. The analysis results of ionomer 1 is shown in Table 2. Table 3 shows the MFR measurement results and odor evaluation results of ionomer 1, and the evaluation results of the self-supporting properties of the resin sheet under high temperatures, and the transparency and coloring properties of the laminated glass.

Example 2

Ionomer 2 was obtained in the same manner as in Example 1 except that EMMA 5 in Table 1 was used, and that 100 parts by mass of a solution of sodium hydroxide in methanol, and 46 parts by mass of concentrated hydrochloric acid were added. The analysis results and evaluation results of the obtained ionomer 2 are shown in Tables 2 and 3.

Example 3

Ionomer 3 was obtained in the same manner as in Example 1 except that EMMA 5 in Table 1 was used, that 95 parts by mass of a solution of sodium hydroxide (16 mass %) in methanol were added to saponify methyl methacrylate units at 100° C. for 10 hours, and that 33 parts by mass of concentrated hydrochloric acid were added. The analysis results and evaluation results of the obtained ionomer 3 are shown in Tables 2 and 3.

Example 4

Ionomer 4 was obtained in the same manner as in Example 1 except that EMMA6 in Table 1 was used, and that 112 parts by mass of a solution of sodium hydroxide in methanol, and 51 parts by mass of concentrated hydrochloric acid were added. The analysis results and evaluation results of the obtained ionomer 4 are shown in Tables 2 and 3.

Example 5

Ionomer 5 was obtained in the same manner as in Example 1 except that EEA2 in Table 1 was used, and that 100 parts by mass of a solution of sodium hydroxide in methanol, and 43 parts by mass of concentrated hydrochloric acid were added. The analysis results and evaluation results of the obtained ionomer 5 are shown in Tables 2 and 3.

Example 6

Ionomer 6 was obtained in the same manner as in Example 1 except that EEA1 shown in Table 1 was used, and that 100 parts by mass of a solution of sodium hydroxide in methanol, and 46 parts by mass of concentrated hydrochloric acid were added. The analysis results and evaluation results of the obtained ionomer 6 are shown in Tables 2 and 3.

Example 7

Ionomer 7 was obtained in the same manner as in Example 1 except that EMA in Table 1 was used, and that 112 parts by mass of a solution of sodium hydroxide in methanol, and 51 parts by mass of concentrated hydrochloric acid were added. The analysis results and evaluation results of the obtained ionomer 7 are shown in Tables 2 and 3.

Example 8

Ionomer 18 was obtained in the same manner as in Example 1 except that EMMA7 in Table 1 was used, and that 100 parts by mass of a solution of sodium hydroxide in methanol, and 46 parts by mass of concentrated hydrochloric acid were added. The analysis results and evaluation results of the obtained ionomer 18 are shown in Tables 2 and 3.

Comparative Example 1

Ionomer 8 was obtained in the same manner as in Example 1 except that EMMA1 in Table 1 was used, and that 40 parts by mass of a solution of sodium hydroxide in methanol, and 18 parts by mass of concentrated hydrochloric acid were added. The analysis results and evaluation results of the obtained ionomer 8 are shown in Tables 2 and 3.

Comparative Example 2

Ionomer 9 was obtained in the same manner as in Example 1 except that EMMA2 in Table 1 was used, and that 72 parts by mass of a solution of sodium hydroxide in methanol, and 33 parts by mass of concentrated hydrochloric acid were added. The analysis results and evaluation results of the obtained ionomer 9 are shown in Tables 2 and 3.

Comparative Example 3

Ionomer 10 was obtained in the same manner as in Example 1 except that EMMA3 in Table 1 was used, and that 80 parts by mass of a solution of sodium hydroxide in methanol, and 37 parts by mass of concentrated hydrochloric acid were added. The analysis results and evaluation results of the obtained ionomer 10 are shown in Tables 2 and 3.

Comparative Example 4

Ionomer 11 was obtained in the same manner as in Example 1 except that EMMA4 in Table 1 was used, and that 78 parts by mass of acetic acid were added instead of adding concentrated hydrochloric acid. The analysis results and evaluation results of the obtained ionomer 11 are shown in Tables 2 and 3.

Comparative Example 5

Ionomer 12 was obtained in the same manner as in Example 1 except that EMMA5 in Table 1 was used, that 100 parts by mass of a solution of sodium hydroxide in methanol was added to saponify methyl methacrylate units at 120° C. for 10 hours, and that 46 parts by mass of concentrated hydrochloric acid were added. The analysis results and evaluation results of the obtained ionomer 12 are shown in Tables 2 and 3.

Comparative Example 6

Ionomer 13 was obtained in the same manner as in Example 3 except that EMMA5 in Table 1 was used, that the reaction time of the saponification reaction was set to 3 hours, and that 39 parts by mass of concentrated hydrochloric acid were added. The analysis results and evaluation results of the obtained ionomer 13 are shown in Tables 2 and 3.

Comparative Example 7

Ionomer 14 was obtained in the same manner as in Example 4 except that EMMA6 in Table 1 was used, and that 47 parts by mass of concentrated hydrochloric acid were added. The analysis results and evaluation results of the obtained ionomer 14 are shown in Tables 2 and 3.

Comparative Example 8

Ionomer 15 was obtained in the same as in Example 1 except that EMA in Table 1 was used, that the saponification reaction time was set to 3 hours, and that 106 parts by mass of a solution of sodium hydroxide in methanol, and 49 parts by mass of concentrated hydrochloric acid were added. The analysis results and evaluation results of the obtained ionomer 15 are shown in Tables 2 and 3.

Comparative Example 9

An ethylene/methacrylic acid ionomer having a content of 6.3 mol % of methacrylic acid units, a content of 1.8 mol % of sodium methacrylate units, and a MFR of 2.7 g/10 min was used as ionomer 16. The analysis results and evaluation results of ionomer 16 are shown in Tables 2 and 3.

Comparative Example 10

An ethylene/n-butyl methacrylate/methacrylic acid ionomer having a content of 6.0 mol % of methacrylic acid units, a content of 2.1 mol % of sodium methacrylate units, and a content of 3.0 mol % of n-butyl methacrylate units, and a MFR of 3.5 g/10 min was used as ionomer 17. The analysis results and evaluation results of ionomer 17 are shown in Tables 2 and 3.

TABLE 2

| | Raw Material Resin | Ionomer | Ionomer Structure | | | |
|---|---|---|---|---|---|---|
| | | | Carboxylic acid units (B) (mol %) | Carboxylic acid neutralized product units (C) (mol %) | (Meth)acrylic acid ester units (A) (mol %) | (A) + (B) + (C) Total (mol %) |
| Example 1 | EMMA 4 | 1 | 6.5 | 1.6 | 0.1 | 8.1 |
| Example 2 | EMMA 5 | 2 | 6.7 | 1.7 | 0.1 | 8.5 |
| Example 3 | EMMA 5 | 3 | 6.2 | 1.5 | 0.8 | 8.5 |
| Example 4 | EMMA 6 | 4 | 7.8 | 2.0 | 0.1 | 9.8 |

TABLE 2-continued

| | Raw Material Resin | Ionomer | Ionomer Structure | | | |
|---|---|---|---|---|---|---|
| | | | Carboxylic acid units (B) (mol %) | Carboxylic acid neutralized product units (C) (mol %) | (Meth)acrylic acid ester units (A) (mol %) | (A) + (B) + (C) Total (mol %) |
| Example 5 | EEA 2 | 5 | 5.9 | 2.5 | 0.1 | 8.5 |
| Example 6 | EEA 1 | 6 | 6.7 | 1.7 | 0.1 | 8.5 |
| Example 7 | EMA | 7 | 7.3 | 1.9 | 0.1 | 9.3 |
| Example 8 | EMMA 7 | 18 | 6.7 | 1.7 | 0.1 | 8.5 |
| Comparative Example 1 | EMMA 1 | 8 | 2.3 | 0.6 | 0.1 | 3.0 |
| Comparative Example 2 | EMMA 2 | 9 | 4.5 | 1.3 | 0.1 | 5.8 |
| Comparative Example 3 | EMMA 3 | 10 | 5.0 | 1.3 | 0.2 | 6.5 |
| Comparative Example 4 | EMMA 4 | 11 | 8.4 | 0.0 | 0.1 | 8.5 |
| Comparative Example 5 | EMMA 5 | 12 | 6.8 | 1.7 | 0.0 | 8.5 |
| Comparative Example 6 | EMMA 5 | 13 | 5.2 | 1.3 | 2.0 | 8.5 |
| Comparative Example 7 | EMMA 6 | 14 | 6.3 | 3.5 | 0.1 | 9.8 |
| Comparative Example 8 | EMA | 15 | 4.3 | 1.1 | 4.0 | 9.3 |
| Comparative Example 9 | — | 16 | 6.3 | 1.8 | 0 | 8.1 |
| Comparative Example 10 | — | 17 | 6.0 | 2.1 | 3.0 | 11.1 |

TABLE 3

| | Ionomer | Ionomer Evaluation | | Resin Sheet Evaluation | | Laminated Glass |
|---|---|---|---|---|---|---|
| | | MFR* (g/10 min) | Odor | E' at 50° C. (MPa) | YI | Evaluation Haze (%) |
| Example 1 | 1 | 1.0 | A | A60 | A0.9 | A2.6 |
| Example 2 | 2 | 1.4 | A | A52 | A0.7 | A4.1 |
| Example 3 | 3 | 1.5 | A | A48 | A0.7 | A3.0 |
| Example 4 | 4 | 1.1 | A | A55 | A1.5 | A2.9 |
| Example 5 | 5 | 1.2 | A | A80 | A1.7 | A2.5 |
| Example 6 | 6 | 0.1 | A | A75 | B2.6 | A2.7 |
| Example 7 | 7 | 3.1 | A | A72 | A1.7 | A3.2 |
| Example 8 | 18 | 2.4 | A | A57 | A1.1 | A2.4 |
| Comparative Example 1 | 8 | 0.3 | A | B15 | A0.9 | C20 |
| Comparative Example 2 | 9 | 0.2 | A | A36 | A1.1 | C12 |
| Comparative Example 3 | 10 | 0.4 | A | A45 | A0.8 | C11 |
| Comparative Example 4 | 11 | 19 | A | B16 | B2.3 | C20 |
| Comparative Example 5 | 12 | 0.7 | A | A55 | A1.1 | B5.5 |
| Comparative Example 6 | 13 | 1.9 | B | B15 | A1.3 | A2.9 |
| Comparative Example 7 | 14 | 0.2 | A | A65 | C3.1 | A2.5 |
| Comparative Example 8 | 15 | 12 | B | B19 | A0.7 | A2.2 |
| Comparative Example 9 | 16 | 2.7 | A | A49 | A1.0 | B5.6 |
| Comparative Example 10 | 17 | 3.0 | B | B28 | B2.4 | A1.9 |

*Measurement condition: 190° C., 2.16 kgf

From the above results, the ionomers of the examples satisfying all the predetermined constituent components of the present invention were well-balanced and excellent in transparency, high elastic modulus and low coloring, and in addition, had a reduced odor during molding processing. On the other hand, the ionomers of the Comparative Examples which lacked any of the constituent components were inferior in any of the performances of transparency, high elastic modulus, low coloring and odor.

The invention claimed is:

1. An ionomer comprising 0.05 to 0.9 mol % of methyl (meth)acrylate units, 4.5 to 9.0 mol % of carboxylic acid units, 0.65 to 2.5 mol % of carboxylic acid neutralized product units, and ethylene units, based on the total monomer units which constitute the resin, with the total content of the methyl (meth)acrylate units, the carboxylic acid units, and the carboxylic acid neutralized product units being 7.0 to 9.5 mol %,
   wherein the ionomer has a yellow index (YI) of 1.7 or less as measured using a 0.8 mm-thick resin sheet-form test piece.

2. The ionomer according to claim 1, having a MFR of 0.7 g/10 min or more, as measured under the conditions at a measurement temperature of 190° C. and a load of 2.16 Kgf.

3. The ionomer according to claim 2, using as a raw material an ethylene-methyl (meth)acrylate copolymer comprising 6.5 to 10 mol % of methyl (meth)acrylate units, and having a MFR of 90 to 400 g/10 min as measured under the conditions at a measurement temperature of 190° C. and load of 2.16 Kgf.

4. The ionomer according to claim 3, having a storage elastic modulus of 30 MPa or more as measured using a 0.8 mm-thick resin sheet-form test piece under the conditions at a measurement temperature of 50° C. and a frequency of 1 Hz, and
   a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

5. The ionomer according to claim 2, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

6. The ionomer according to claim 1, using as a raw material an ethylene-methyl (meth)acrylate copolymer comprising 6.5 to 10 mol % of methyl (meth)acrylate units, and having a MFR of 90 to 400 g/10 min as measured under the conditions at a measurement temperature of 190° C. and load of 2.16 Kgf.

7. The ionomer according to claim 6, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

8. The ionomer according to claim 1, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

9. A resin composition containing the ionomer according to claim 1 in an amount of 93 mass % or more.

10. A resin sheet substantially consisting of the resin composition according to claim 9.

11. Laminated glass having two glass plates and the resin sheet according to claim 10 as an interlayer film arranged between the two glass plates.

12. The ionomer according to claim 1, wherein the ionomer comprises 0.65 to 2.0 mol % of carboxylic acid neutralized product units.

13. The ionomer according to claim 12, using as a raw material an ethylene-methyl (meth)acrylate copolymer comprising 6.5 to 10 mol % of methyl (meth)acrylate units, and having a MFR of 90 to 400 g/10 min as measured under the conditions at a measurement temperature of 190° C. and load of 2.16 Kgf.

14. The ionomer according to claim 13, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

15. The ionomer according to claim 12, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

16. The ionomer according to claim 1,
wherein the methyl (meth)acrylate units are methyl methacrylate units, and
the ionomer has a yellow index (YI) of 1.1 or less as measured using a 0.8 mm-thick resin sheet-form test piece.

17. The ionomer according to claim 16, using as a raw material an ethylene-methyl methacrylate copolymer comprising 6.5 to 10 mol % of methyl methacrylate units, and having a MFR of 90 to 400 g/10 min as measured under the conditions at a measurement temperature of 190° C. and load of 2.16 Kgf.

18. The ionomer according to claim 17, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

19. The ionomer according to claim 16, having a storage elastic modulus of 30 MPa or more as measured using a 0.8 mm-thick resin sheet-form test piece under the conditions at a measurement temperature of 50° C. and a frequency of 1 Hz, and a haze of 5.0% or less as measured using laminated glass which is formed after a 0.8 mm-thick resin sheet-form test piece is arranged between two glass plates, heated to 140° C., and then gradually cooled to 23° C. at a rate of 0.1° C./min.

\* \* \* \* \*